US011269703B2

(12) United States Patent
Shimada et al.

(10) Patent No.: US 11,269,703 B2
(45) Date of Patent: Mar. 8, 2022

(54) INFORMATION PROCESSING SYSTEM AND STORAGE DEVICE CONTROL METHOD TO DETERMINE WHETHER DATA HAS BEEN CORRECTLY WRITTEN INTO A STORAGE DEVICE

(71) Applicant: Hitachi, Ltd., Tokyo (JP)

(72) Inventors: Kentaro Shimada, Tokyo (JP); Makio Mizuno, Tokyo (JP)

(73) Assignee: HITACHI, LTD., Tokyo (JP)

( * ) Notice: Subject to any disclaimer, the term of this patent is extended or adjusted under 35 U.S.C. 154(b) by 217 days.

(21) Appl. No.: 16/560,308

(22) Filed: Sep. 4, 2019

(65) Prior Publication Data
US 2020/0159605 A1 May 21, 2020

(30) Foreign Application Priority Data

Nov. 15, 2018 (JP) .............................. JP2018-214314

(51) Int. Cl.
*G06F 11/07* (2006.01)
*G06F 3/06* (2006.01)

(52) U.S. Cl.
CPC ........ *G06F 11/0727* (2013.01); *G06F 3/0619* (2013.01); *G06F 3/0649* (2013.01); *G06F 11/0763* (2013.01)

(58) Field of Classification Search
CPC ...... G06F 3/0652; G06F 3/064; G06F 3/0643; G06F 3/0679; G06F 16/2379; G06F 2212/7205; G06F 2212/7209; G06F 11/068; G06F 11/1471; G06F 11/1474;
(Continued)

(56) References Cited

U.S. PATENT DOCUMENTS 5,369,616 A * 11/1994 Wells .................... G06F 3/0601
365/185.22
5,701,516 A * 12/1997 Cheng .................. G06F 12/0866
710/22

(Continued)

FOREIGN PATENT DOCUMENTS

JP       2009-064363 A      3/2009

OTHER PUBLICATIONS

Information technology—SCSI Block Commands—4 (SBC-4), Revision 13, Feb. 17, 2017, Project T10/BSR INCITS 506.
NVM Express Revision 1.3, May 1, 2017, NVM Express.

*Primary Examiner* — Joseph O Schell
(74) *Attorney, Agent, or Firm* — Baker Botts L.L.P.

(57) ABSTRACT

It is detected whether write data has been correctly transmitted to a storage device under a protocol for directly connecting the storage device to a processor. An information processing system including: a processor; a memory; and a storage device, the processor first transmitting to the storage device, a command to invalidate data in a data area and which is designated by a write command, the storage device invalidating the data, the processor second transmitting to the storage device, the write command to write the data into the data area, and the storage device writing the data into the data area in accordance with the write command, validating the data in a data area into which the storage device has been successful in writing the data, and maintaining the data invalidated in a data area into which the storage device has failed in writing the data.

10 Claims, 11 Drawing Sheets

(58) Field of Classification Search
CPC .. G06F 3/0619; G06F 3/0649; G06F 11/0763; G06F 11/0727; G06F 11/1068; G11C 16/105

See application file for complete search history.

(56) References Cited

U.S. PATENT DOCUMENTS

| | | | | |
|---|---|---|---|---|
| 5,930,815 | A * | 7/1999 | Estakhri | G06F 11/1068 711/103 |
| 5,964,835 | A * | 10/1999 | Fowler | G06F 11/1604 709/216 |
| 6,598,135 | B1 * | 7/2003 | MacLeod | G11B 7/00745 369/275.2 |
| 2002/0069313 | A1 * | 6/2002 | Douniwa | G06F 12/0246 711/102 |
| 2009/0067081 | A1 | 3/2009 | Sato et al. | |
| 2013/0067179 | A1 * | 3/2013 | Paleologu | G06F 11/1076 711/159 |
| 2013/0205097 | A1 * | 8/2013 | Flynn | G06F 12/0246 711/142 |
| 2014/0006685 | A1 * | 1/2014 | Peterson | G06F 3/0688 711/102 |

* cited by examiner

FIG. 8A
DATA INVALIDATING COMMAND

| COMMAND CODE (DATA INVALIDATION) | TAG | BLOCK ADDRESS | NUMBER OF BLOCKS |
|---|---|---|---|

FIG. 8B
Write COMMAND

| COMMAND CODE (DATA WRITE) | TAG | BLOCK ADDRESS | NUMBER OF BLOCKS | WRITE DATA MEMORY ADDRESS |
|---|---|---|---|---|

FIG. 8C
Read COMMAND

| COMMAND CODE (DATA READ) | TAG | BLOCK ADDRESS | NUMBER OF BLOCKS | READ DATA MEMORY ADDRESS |
|---|---|---|---|---|

FIG. 8D
DATA INVALIDATING COMMAND COMPLETION RESPONSE

| RESPONSE CODE (DATA INVALIDATING COMMAND COMPLETION) | TAG | END STATUS |
|---|---|---|

FIG. 8E
Write COMMAND COMPLETION RESPONSE

| RESPONSE CODE (Write COMMAND COMPLETION) | TAG | END STATUS |
|---|---|---|

FIG. 8F
Read COMMAND COMPLETION RESPONSE

| RESPONSE CODE (Read COMMAND COMPLETION) | TAG | END STATUS |
|---|---|---|

FIG. 8G
INVALIDATED DATA RESPONSE

| RESPONSE CODE (INVALIDATED DATA RESPONSE) | TAG | END STATUS | INVALIDATED DATA BLOCK ADDRESS |
|---|---|---|---|

ZERO DATA Write COMMAND

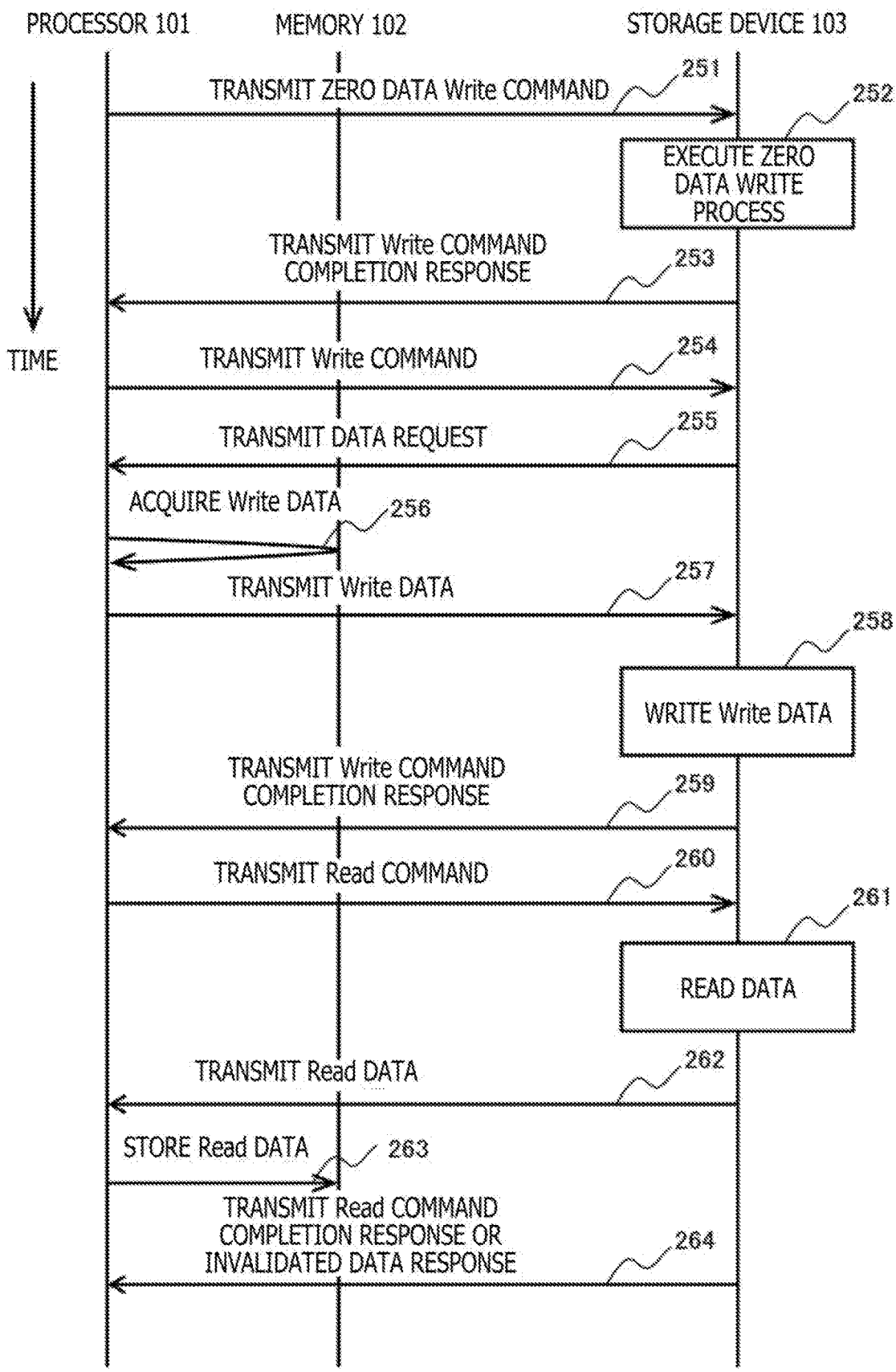

INFORMATION PROCESSING SYSTEM AND STORAGE DEVICE CONTROL METHOD TO DETERMINE WHETHER DATA HAS BEEN CORRECTLY WRITTEN INTO A STORAGE DEVICE

CLAIM OF PRIORITY

The present application claims priority from Japanese patent application JP 2018-214314 filed on Nov. 15, 2018, the content of which is hereby incorporated by reference into this application.

BACKGROUND OF THE INVENTION

1. Field of the Invention

The present invention relates to a write error in a storage device in an information processing system such as a storage system.

2. Description of the Related Art

A storage system is configured with a controller and non-volatile storage devices, and the controller is configured with a processor that executes system control and a volatile memory that stores data. JP-2009-64363-A, for example, discloses an example of the storage system. Such a storage system retains data by writing user data temporarily stored in the memory of the controller into the storage device.

Such a storage device uses a specific communication protocol for ensuring the transmission and reception of the user data to/from the controller. Examples of this protocol include SCSI (small computer system interface), Fibre Channel, and SAS (serial attached SCSI). Under such a protocol, the controller has a dedicated protocol control unit in addition to the processor, and the protocol control unit has a function to assign a data protection code and to check the assigned data protection code for enhancing correctness of the transmitted/received data.

Furthermore, JP-2009-64363-A discloses a technique for guaranteeing that new data has been written at a time of writing data into a storage device by assigning an identifier to each data using assignment of the data protection code. Assigning different identifiers to respective data enables older data to which an old identifier is assigned to be read at a time of reading data in a case of a failure to write new data. Owing to this, checking the identifiers enables identification that the older data has been read because of the failure to write the new data.

In contrast to this, in recent years, a new protocol such as NVM Express (registered trademark) for directly connecting the storage device to the processor within the controller without use of the protocol control unit has been designed. In a case of using such a protocol, the processor within the controller needs to assign and check the data protection code and the identifiers because of lack of the protocol control unit.

Moreover, to test error occurrence in the storage device, a communication protocol for use in such a storage device defines a command, that is, data invalidating command to turn designated data on the storage device into an Uncorrectable Error state on purpose. For example, the SCSI defines a Write Long command in "Information technology—SCSI Block Commands-4 (SBC-4): Revision 13 17 Feb. 2017: Project T10/BSR INCITS 506: International Committee for Information Technology Standards (INCITS) T10 Technical Committee." In addition, the NVM Express defines a Write Uncorrectable command in "NVM Express Revision 1.3: May 1, 2017: NVM Express, Inc." These commands are, for example, optional commands in the protocols. Using these data invalidating commands makes it possible to turn specific data in the storage device into an Uncorrectable Error state and to conduct a test of determining error occurrence to the storage device or an operation test related to error handling in the storage system at the time of error occurrence to the storage device.

Under the protocol such as the NVM Express for directly connecting the storage device to the processor, the processor needs to execute assignment and check of the data protection code and the identifiers. This disadvantageously increases a load on the processor, resulting in performance degradation as the storage system.

However, in a case of using such a protocol for directly connecting the storage device to the processor, the following problem occurs without assignment and check of such a data protection code and identifiers because of lack of the protocol control unit. There is no choice but to cause the storage device itself to check whether write data has been correctly transmitted to the storage device and whether the data has been correctly written into the storage device, and the storage device is unable to detect loss of the write data due to a temporary error in the storage device itself.

As another method of checking whether data has been correctly written into the storage device, there is known a method of temporarily writing data into the storage device and then reading the data again to check the data; however, involving reading the data again results in high overhead.

The present invention has been achieved in the light of these problems, and a main purpose of the present invention is to check whether data has been correctly written into a storage device at low overhead under a protocol, such as NVM Express, for directly connecting the storage device to a processor.

Another purpose of the present invention is to reduce overhead incurred by check of data write using a data invalidating command, which has been conventionally used in a test to determine error occurrence to a storage device, to turn designated data on a storage device into an Uncorrectable Error state not in the test to determine the error occurrence but in check as to whether data has been correctly written without an error at a time of writing data into the storage device.

SUMMARY OF THE INVENTION

To solve at least one of the above problems, an outline of a representative aspect of the invention disclosed in this application will be briefly described as follows. An information processing system according to the representative aspect of the present invention is an information processing system including: a processor; a memory connected to the processor; and storage devices connected to the processor. Further, the processor transmits, to the storage devices, a command to invalidate data in a data area into which data is to be written and which is designated by a write command, before transmitting the write command to the storage device; the storage device invalidates the data in the data area into which data is to be written in accordance with the command to invalidate the data in the data area into which data is to be written; and the processor transmits, to the storage device, the write command to write the data into the data area into which data is to be written. Still further, the storage device writes the data into the data area into which data is to be written in accordance with the write command, validates the data in the data area if the storage device has been successful in writing the data into at least part of the data area into which data is to be written, and maintains the data invalidated in the data area into which data is to be written in a case in which the storage device has failed in writing the data into the at least part of the data area into which data is to be written.

According to one aspect of the present invention, it is possible to reduce overhead of check as to whether data has been correctly written into a storage device under a protocol, such as NVM Express, for directly connecting the storage device to a processor.

Objects, configurations, and advantages other than those described above will be readily apparent from the description of embodiments given below.

BRIEF DESCRIPTION OF THE DRAWINGS

FIGS. 8A to 8G are explanatory diagrams depicting an example of commands and responses exchanged between the processor and the storage device according to the first to fourth embodiments of the present invention;

FIG. 10 is a sequence diagram depicting another example of the flow of processes including up to the data read process according to the third and fourth embodiments of the present invention.

DESCRIPTION OF THE PREFERRED EMBODIMENTS

Several embodiments of the present invention will be described hereinafter with reference to the drawings.

First Embodiment

A first embodiment will be described with reference to FIGS. 1A, 1B, and 8A to 8G.

Figure 1A:
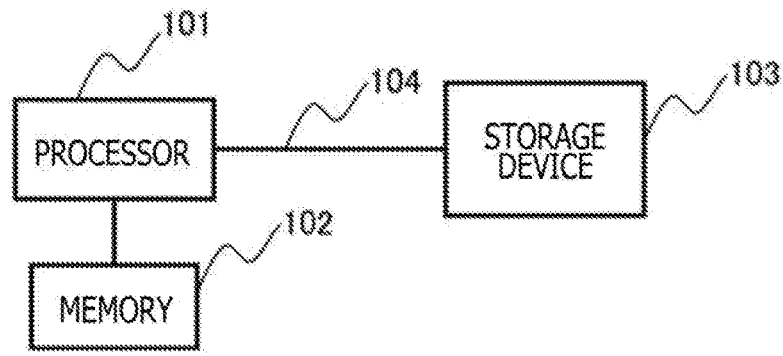
FIG. 1A is a block diagram depicting an example of connection of a storage device according to first to fourth embodiments of the present invention.

FIG. 1A is a block diagram depicting an example of a configuration of connection between a storage device and a processor according to the embodiments of the present invention. A processor 101 is connected to a memory 102, and performs processes by executing an instruction code, that is, control program, placed on the memory 102 and reading/writing data placed on a location different from a location of the instruction code on the memory 102. The processes executed by the processor 101 in the following description are executed in accordance with the control program on the memory 102.

In addition, the processor 101 is connected to a storage device 103. The storage device 103 is a non-volatile storage device, which is, for example, a non-volatile solid state device. The processor 101 and the storage device 103 are connected to each other by an IO bus 104 owned by the processor 101. A typical example of the IO bus is PCI Express. The processor 101, the memory 102, and the storage device 103 configure an information processing system.

Although not described in FIG. 1A, the storage device 103 similarly incorporates therein a processor and a memory, and various processes are achieved in the storage device 103 by the processor executing a control program on the memory. In other words, the processes executed by the storage device 103 in the following description are executed by the processor incorporated in the storage device 103 in accordance with the program on the memory incorporated in the storage device 103.

Furthermore, the storage device 103 reads/writes data by multiple of blocks which has a certain size. The processor 101 transmits commands to read/write data in each block unit to the storage device 103. Out of these commands, an example of a Write command to write data is described in FIG. 8B and an example of a Read command to read data is described in FIG. 8C.

The Write command contains a command code that indicates that the command is a Write command, a tag that identifies the Write command from among a plurality of Write commands, a block address that designates a data block on the storage device 103, the number of blocks to be written, and a Write data memory address that designates a location of Write data on the memory 102.

The Read command contains a command code that indicates that the command is a Read command, a tag that identifies the Read command from among a plurality of Read commands, a block address that designates a data block on the storage device 103, the number of blocks to be read, and a Read data memory address that designates a location of Read data on the memory 102.

Assigning the addresses of the data on the memory 102 to the Read command and the Write command enables the storage device 103 directly connected to the processor 101 to directly read the Write data from the memory 102 or to directly store the Read data into the memory 102.

Moreover, in the present embodiment, before data is written into the storage device 103, the processor 101 transmits a data invalidating command to the storage device 103 to cause the storage device 103 to execute data invalidation. An example of the data invalidating command is described in FIG. 8A. The data invalidating command does not need data itself; thus, the data invalidating command is formed from a command code that indicates that the command is a data invalidating command, a tag that identifies the data invalidating command from among a plurality of data invalidating commands, a block address that designate a data block in which data is to be invalidated on the storage device 103, and the number of blocks to be invalidated. In addition, an address on the memory 102 is not assigned to the data invalidating command.

This data write operation will next be described in detail with reference to FIG. 1B.

Figure 1B:
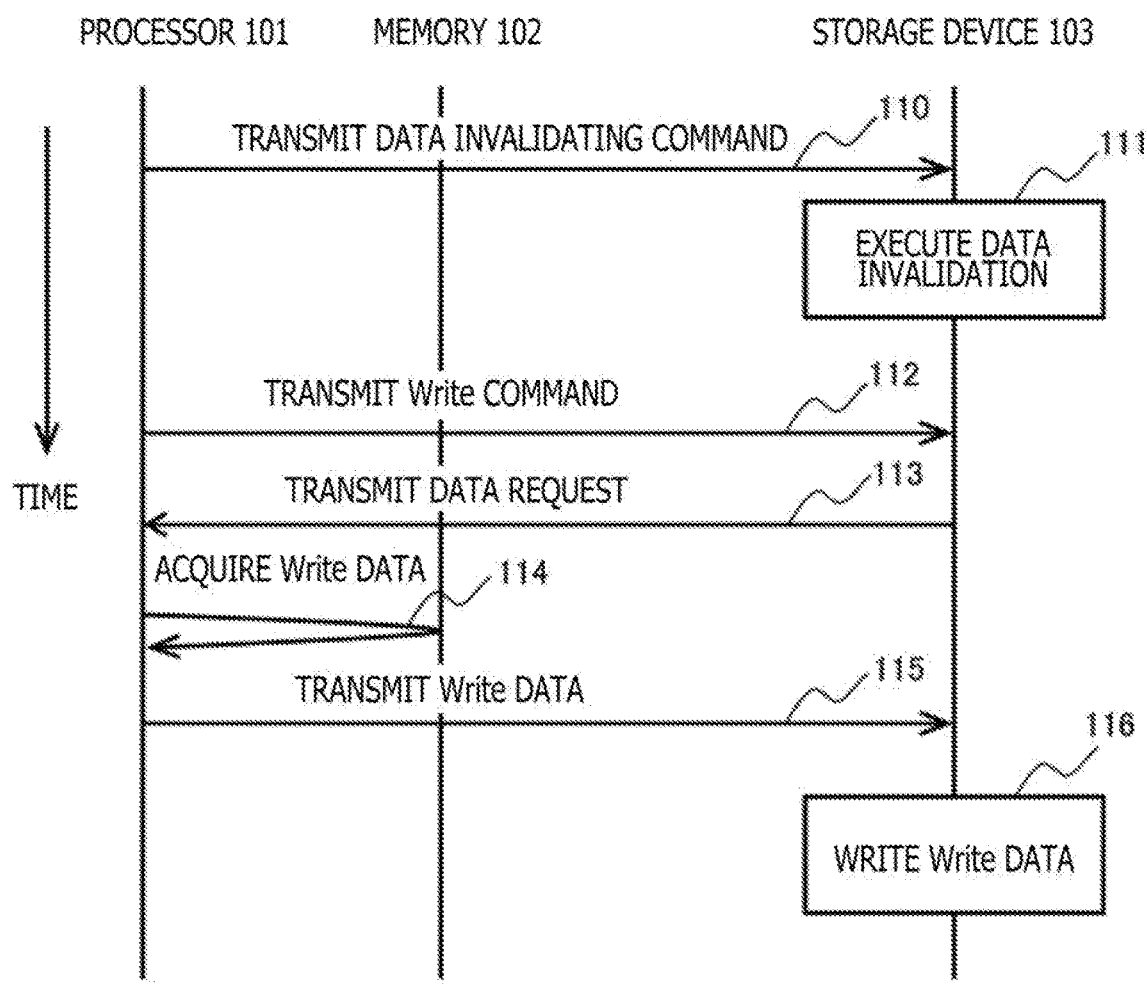
FIG. 1B is a sequence diagram depicting an example of a flow of processes according to the first embodiment of the present invention.

In processes of FIG. 1B, at a time of writing data into the storage device 103, the processor 101 transmits first the data invalidating command to the storage device 103 in Procedure 110. The storage device 103 executes data invalidation on the data blocks designated by the received data invalidating command in Procedure 111. The data blocks designated herein is the same as the data blocks designated by a Write command to be transmitted later. The area into which data is to be written by the subsequent Write command is thereby invalidated. Although not described in FIG. 1B, the storage device 103 transmits a data invalidating command completion response to the processor 101 upon completion with the data invalidation in Procedure 111.

Next, the processor 101 transmits the Write command to the storage device 103 in Procedure 112. Upon reception of the Write command, the storage device 103 transmits a data request to acquire Write data on the memory 102 byway of the processor 101 in accordance with the designated memory address of the Write data.

The processor 101 acquires the Write data on the memory 102 in accordance with the transmitted data request in Procedure 114. Subsequently, the processor 101 transmits the data acquired from the memory 102 to the storage device 103 in Procedure 115. The storage device 103 writes the Write data transmitted in Procedure 115 to the block address in the storage device 103 designated by the Write command in Procedure 116.

It is noted that operations performed by the processor 101 in Procedures 114 and 115 may be realized either by providing, on the processor 101, a hardware function in accordance with the data request transmitted from the storage device 103 in Procedure 113 or by software operation on the processor 101.

Through the procedures described above, every block indicated by the block address designated by the Write command is invalidated in Procedure 111 before writing data; thus, in a case in which the Write data is not written into the storage device 103 by a malfunction or an error of some sort in any of acquisition of the Write data on the memory 102 in Procedure 114, transmission of the Write data in Procedure 115, or writing of the Write data into the storage device 103 in Procedure 116, then data in the block remains invalidated and the invalidated block can be detected in subsequent data read.

Second Embodiment

A second embodiment of the present invention will next be described with reference to FIGS. 1A, 2, 3, 4, and 8A to 8G. Since sections in the second embodiment are the same as those denoted by the same reference codes in the first embodiment described in FIGS. 1A and 1B, 8A to 8C, and the like except for differences described below, description of the sections will be omitted.

In the second embodiment of the present invention, when receiving the data invalidating command, the Write command, or the Read command, and being completed with the data invalidation, a Write process, or a Read process, the storage device 103 transmits to the processor 101 the data invalidating command completion response, a Write command completion response, or a Read command completion response or an invalidated data response. An example of the data invalidating command completion response is described in FIG. 8D, an example of the Write command completion response is described in FIG. 8E, an example of the Read command completion response is described in FIG. 8F, and an example of the invalidated data response is described in FIG. 8G.

It is assumed in the present embodiment, similarly to the first embodiment, that the processor 101, the memory 102, and the storage device 103 are provided, the memory 102 is connected to the processor 101, and the storage device 103 and the processor 101 are connected to each other by the IO bus 104, as described in FIG. 1A.

In the present embodiment, operations including writing data into the storage device 103 and subsequently reading data from the storage device 103 will be described with reference to FIG. 2.

Figure 2:
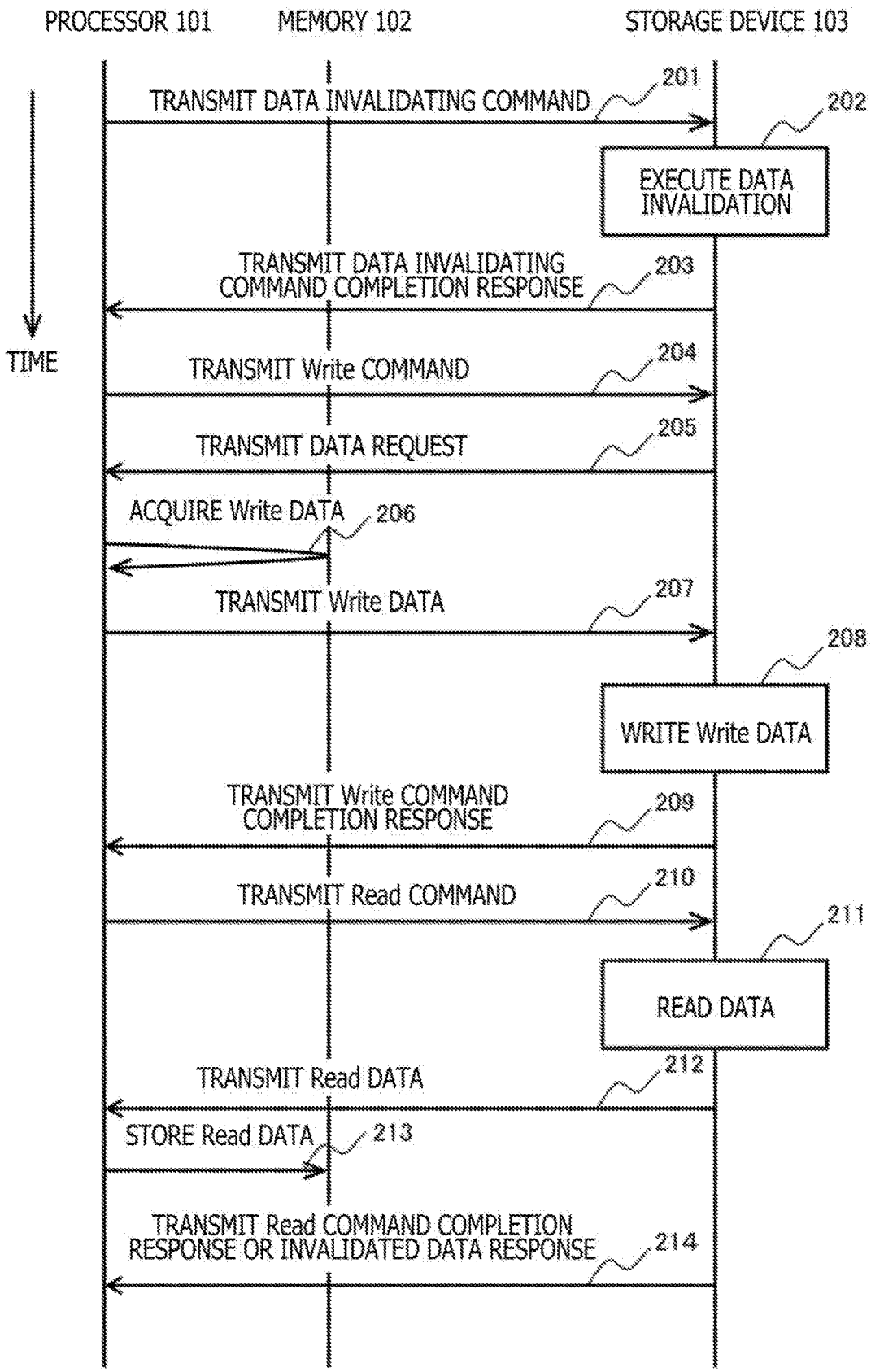
FIG. 2 is a sequence diagram depicting an example of a flow of processes including up to a data read process according to the second embodiment of the present invention.

In FIG. 2, before writing data first into the storage device 103, the processor 101 transmits the data invalidating command to invalidate data in an area to the storage device 103 in Procedure 201. An example of this data invalidating command is that described in FIG. 8A.

Upon reception of the data invalidating command, the storage device 103 executes designated data invalidation in Procedure 202. Similarly to the case of the first embodiment, the data block designated herein is the same as the data block designated by a Write command to be transmitted later. The area into which data is to be written by the subsequent Write command is thereby invalidated. Upon completion with the data invalidation, the storage device 103 transmits the data invalidating command completion response to the processor 101 in Procedure 203.

Next, the processor 101 transmits the Write command to write data into the area to the storage device 103 in Procedure 204. An example of this Write command is that described in FIG. 8B.

Upon reception of the Write command in Procedure 204, the storage device 103 transmits the data request to acquire the Write data on the memory 102 by way of the processor 101 in accordance with the designated memory address of the Write data in Procedure 205.

The processor 101 acquires the Write data on the memory 102 in accordance with the transmitted data request in Procedure 206. Subsequently, the processor 101 transmits the data acquired from the memory 102 to the storage device 103 in Procedure 207.

The storage device 103 writes the Write data transmitted in Procedure 207 to the block address in the storage device 103 designated by the Write command in Procedure 208. It is noted that operations performed by the processor 101 in Procedures 206 and 207 may be realized either by providing, on the processor 101, the hardware function in accordance with the data request transmitted from the storage device 103 in Procedure 205 or by the software operation on the processor 101.

Upon completion with writing the Write data into the storage device 103 in Procedure 208, the storage device 103 transmits a Write command completion response to the processor 101 in Procedure 209.

The processor 101 then transmits a Read command to the storage device 103 in Procedure 210. An example of this Read command is that described in FIG. 8C. Upon reception of the Read command, the storage device 103 reads data from the designated block address in the storage device 103 in Procedure 211. Next, the storage device 103 transmits the Read data to the processor 101 in Procedure 212.

The processor 101 stores the transmitted Read data in the memory 102 in Procedure 213. This storing the Read data into the memory 102 may be realized either by providing, on the processor 101, the hardware function in accordance with the data transmitted from the storage device 103 in Procedure 212 or by the software operation on the processor 101.

Finally, in Procedure 214, the storage device 103 transmits a Read command completion response to the processor 101 in a case of having been successful in reading the Read data in Procedure 211, or transmits an invalidated data response thereto in a case of having read invalidated data in Procedure 211.

The operations performed by the storage device 103 according to the present embodiment will be described in more detail with reference to FIGS. 3 and 4.

Figure 3:
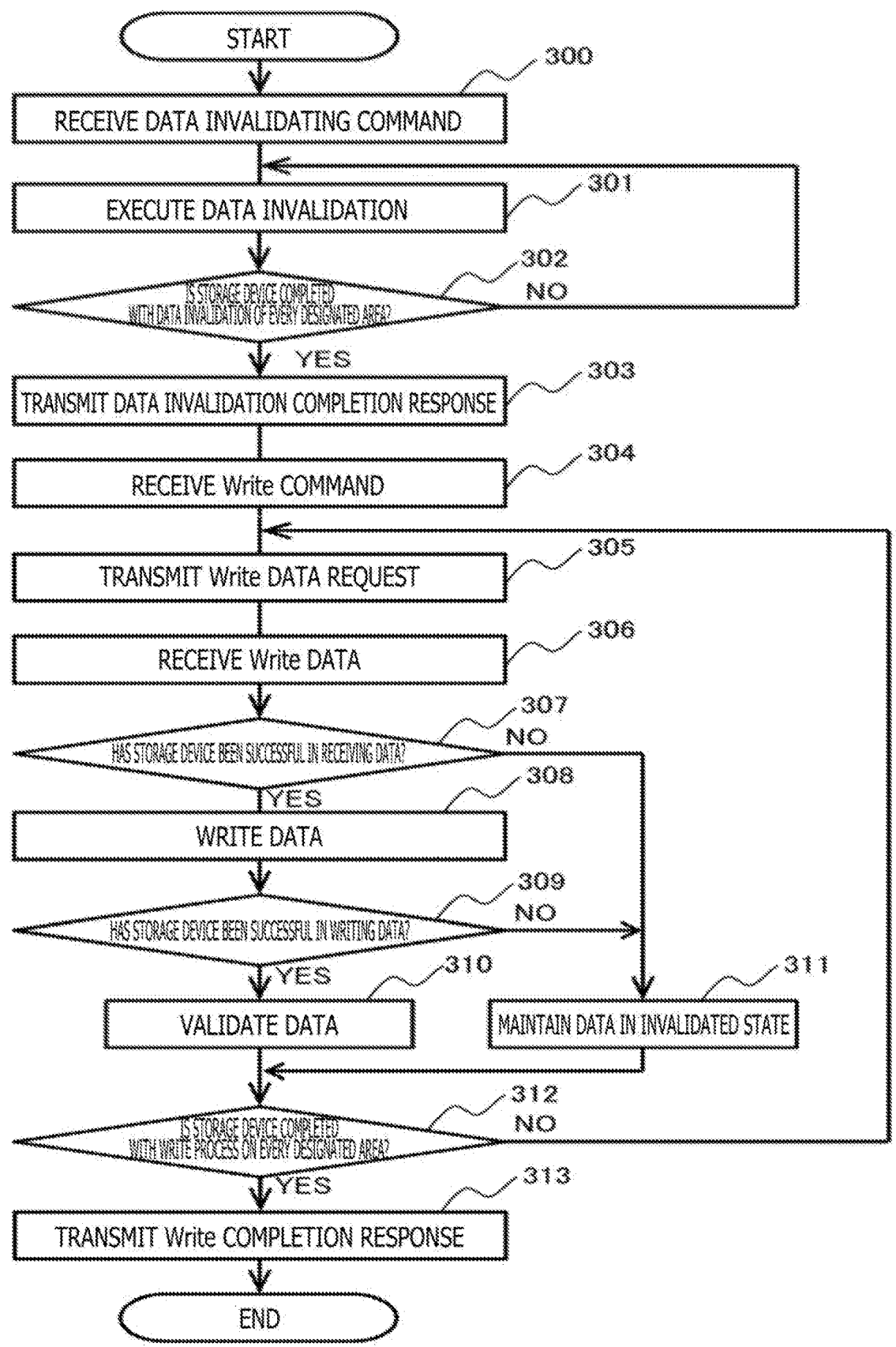
FIG. 3 is a flowchart depicting an example of a data write process by the control program over the storage device operating on the storage device according to the second embodiment of the present invention.

FIG. 3 is an example of a flowchart of operations when the storage device 103 receives the data invalidating command and the Write command in Procedures 201 to 209 of FIG. 2.

In FIG. 3, the storage device 103 receives the data invalidating command in Step 300. This corresponds to Procedure 201 of FIG. 2. Next, the storage device 103 reaches Step 301, and executes the data invalidation in accordance with an instruction of the received data invalidating command. The storage device 103 then determines whether the data invalidation of every designated area is completed in Step 302. In a case in which a determination result of Step 302 is NO, the storage device 103 returns to Step 301 to execute the data invalidation until the data invalidation of every designated area is completed. Processes in Steps 301 and 302 correspond to Procedure 202 of FIG. 2.

While the storage device 103 may actually write data of some sort, for example, data in a predetermined pattern, indicating invalidation into the data block designated by the data invalidating command in Step 301, the storage device 103 may assign, to the data block, a mark indicating that a read error is transmitted to the processor 101 in a case of receiving the Read command to read any data from the data blocks without writing the predetermined pattern data to indicate invalidation. In this case, in a case in which the storage device 103 has been successful in writing the Write data in Step 310, the mark corresponding to the data is deleted. Assigning the predetermined mark without actually writing data makes it possible to mitigate a load of the processes by the storage device 103.

When the data invalidation of every designated area is completed in Step 302, the storage device 103 reaches Step 303 to transmit the data invalidation completion response to the processor 101. This Step 303 corresponds to Procedure 203 of FIG. 2.

In Step 304, the storage device 103 receives the Write command. This Step 304 corresponds to Procedure 204 of FIG. 2. Next, in Step 305 in FIG. 3, the storage device 103 transmits the Write data request to the processor 101 in accordance with the received Write command in Step 305. Subsequently, in Step 306, the storage device 103 receives the requested Write data in Step 306.

In Step 307, the storage device 103 determines whether the storage device 103 has been successful in receiving the Write data. In a case of having been successful in receiving the Write data as a result of determination, the storage device 103 writes the Write data into an internal memory media within the storage device 103 in Step 308. When the storage device 103 is a semiconductor drive, or solid state drive, that is, a non-volatile solid state device, the internal memory media is, for example, a flash memory incorporated into the semiconductor drive.

In Step 309, the storage device 103 determines whether the storage device 103 has been successful in writing the Write data into the internal memory media. In a case of determining that the storage device 103 has been successful, the storage device 103 performs a process for validating the data in Step 310.

In a case in which the storage device 103 has not been successful in receiving the Write data in Step 307 or in which the storage device 103 has not been successful in writing the Write data into the internal memory media in Step 309, the storage device 103 goes to Step 311 to maintain the data in an invalidated state.

In Step 312, the storage device 103 determines whether the storage device 103 completes processing every area designated by the received Write command. In a case in which the storage device 103 does not complete processing, the storage device 103 returns to Step 305 to repeat subsequent processes.

In a case in which the storage device 103 completes processing, the storage device 103 reaches Step 313, transmits a Write completion response to the processor 101, and ends the processes.

Figure 4:
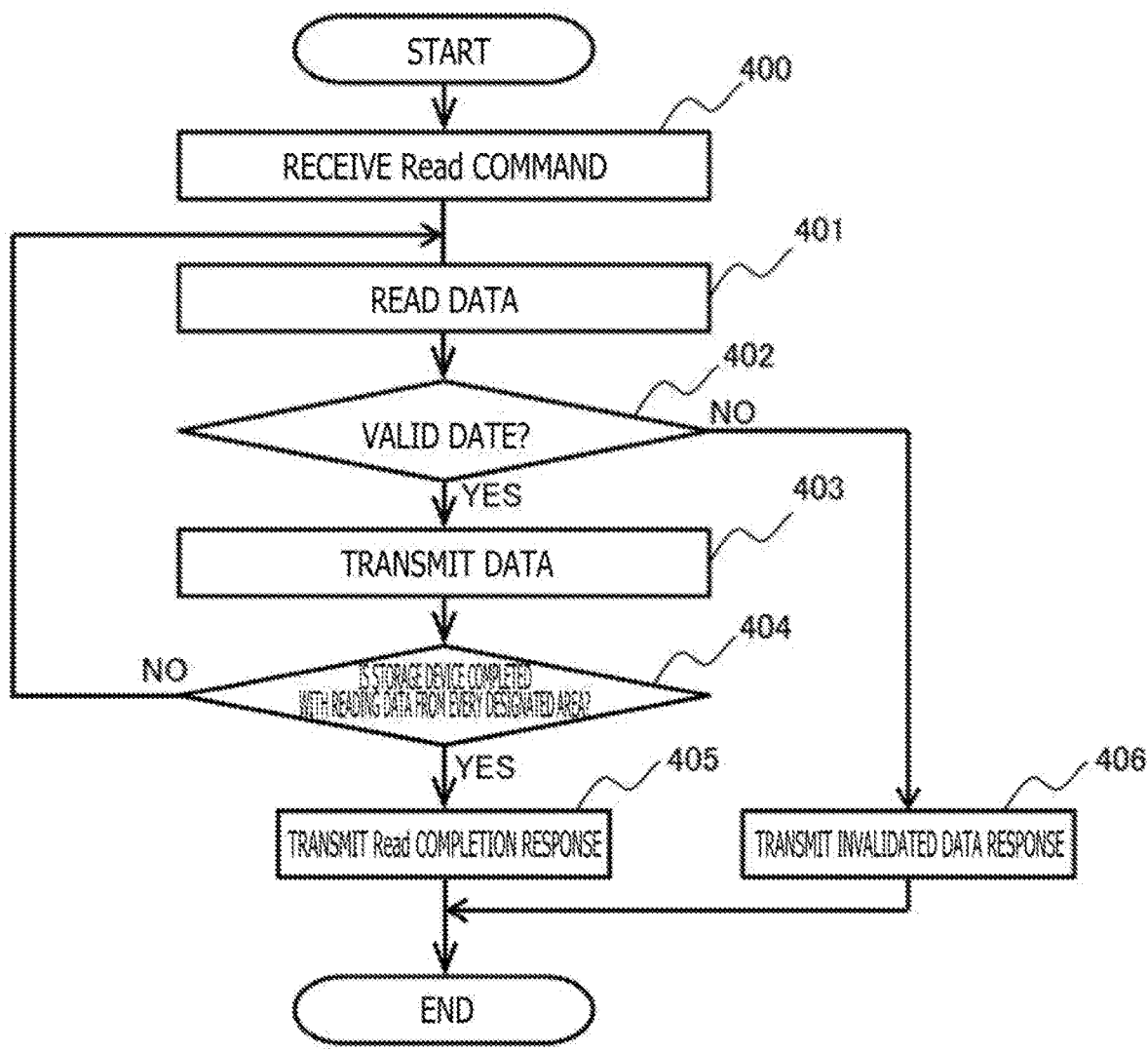
FIG. 4 is a flowchart depicting an example of a data read process by the control program over the storage device operating on the storage device according to the second embodiment of the present invention.

FIG. 4 is an example of a flowchart of operations when the storage device 103 receives the Read command in Procedures 210 to 214 of FIG. 2.

In FIG. 4, the storage device 103 receives the Read command in Step 400. The storage device 103 then goes to Step 401 to read the designated data from the internal memory media. It is noted herein that, similarly to FIG. 3, when the storage device 103 is the semiconductor drive, the internal memory media is, for example, the flash memory incorporated into the semiconductor drive.

The storage device 103 then determines whether the data read from the internal memory media is valid data in Step 402. In a case in which the data is valid data as a result of determination, the storage device 103 transmits the data to the processor 101 in Step 403. The storage device 103 then goes to Step 404 to determine whether the storage device 103 completes reading data from every area designated by the Read command. In a case in which there remains a designated area from which the storage device 103 does not complete reading data as a result of determination, the storage device 103 returns to Step 401 to repeat subsequent processes.

In a case in which the storage device 103 completes reading data from every designated area as a result of the determination in Step 404, the storage device 103 transmits a Read completion response to the processor 101 in Step 405 and ends the processes.

In a case of determining in Step 402 that the data read from the internal memory media is not valid data, the storage device 103 goes to Step 406 to transmit an invalidated data response to the processor 101 and ends the processes. For example, in a case of receiving the Read command to read data from the block remaining invalidated in Step 301 of FIG. 3, the mark indicating that the read error is transmitted to the processor 101 is assigned to the block; thus, the storage device 103 determines that the data is not valid on the basis of the mark in Step 402, and transmits the read error in Step 406 as the invalidated data response.

In the present embodiment, by executing the processes described above, the storage device 103 transmits the response indicating that the data is invalid data to the processor 101 and the processor 101 can determine the invalidated data in the case in which the storage device 103 has not been successful in writing the data at the time of reading the data from the storage device 103. In addition, the storage device 103 transmits the response indicating whether the data is invalid data to the processor 101; thus, it is unnecessary for the processor 101 to inspect the Read data again and the overhead in the processor 101 can be reduced.

Third Embodiment

A third embodiment of the present invention will next be described with reference to FIGS. 1A, 5, 6, 7, 9, and 10. Since sections in the third embodiment are the same as those denoted by the same reference codes in the first and second embodiments described in FIGS. 1A and 1B to 4, 8A to 8G, and the like except for differences described below, description of the sections will be omitted.

Figure 9A:
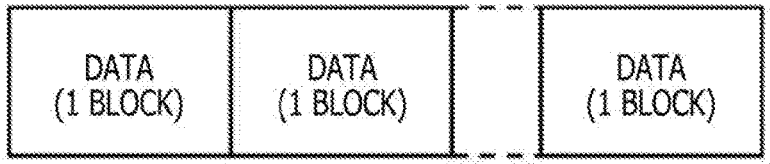
FIGS. 9A to 9D are explanatory diagrams depicting an example of data and metadata exchanged between the processor and the storage device according to the third and fourth embodiments of the present invention.
Figure 9B:
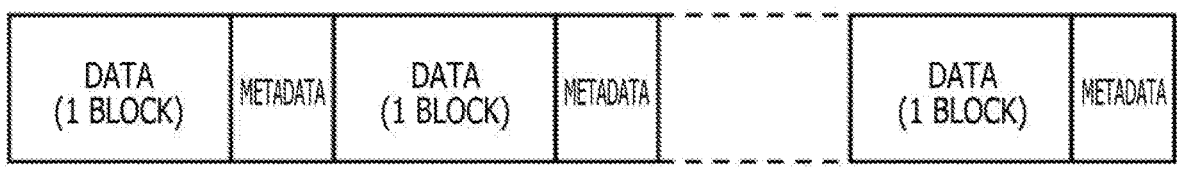
Figure 9C:
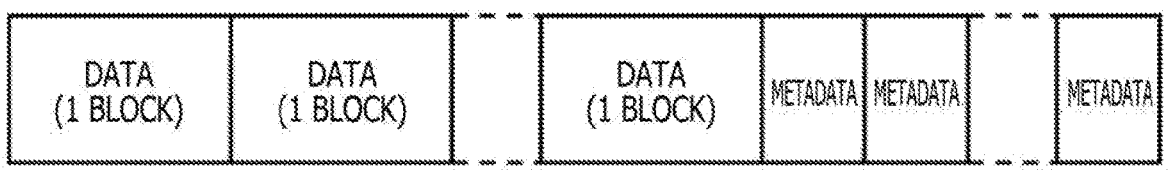

In the third embodiment of the present invention, data to which metadata is assigned is stored in the storage device 103 as described in FIG. 9B or 9C, as opposed to data in blocks described in FIG. 9A. Out of FIGS. 9B and 9C, FIG. 9B describes an example of a format of assigning metadata to each data in one block and FIG. 9C describes an example of a format of collectively assigning metadata about all blocks of data separately from the data in blocks.

Figure 9D:
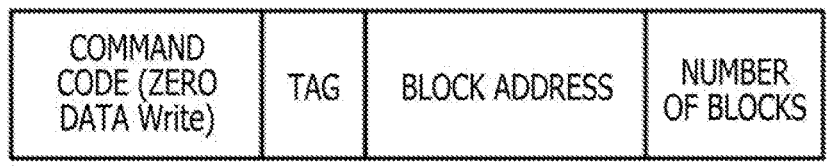

Furthermore, while the data invalidating command is used in the first and second embodiments, the data invalidating command is an example of a command to invalidate an area into which data is to be written and the other command may be used. The third embodiment illustrates an example of using, as the command to invalidate the area into which data is to be written in the storage device 103, a zero data Write command as an alternative to the data invalidating command. FIG. 9D describes an example of the zero data Write command. Since data to be written is determined as zero data, the zero data Write command is formed from, similarly to the data invalidating command of FIG. 8A, a command code, a tag that identifies the zero data Write command from among a plurality of zero data Write commands, a block address that designates a data block, into which zero data is to be written, on the storage device 103, and the number of blocks into which zero data is to be written. In addition, an address on the memory 102 is not assigned to the zero data Write command.

Furthermore, in the present embodiment, the storage device 103 receiving the zero data Write command writes the zero data as the data and writes '1' as the metadata assigned to data in every block. In contrast to this, in a case of receiving a normal Write command, the storage device 103 writes the Write data, that is, Write data transmitted in Procedure 257 of FIG. 10 to be described later, as the data in response to the Write command, and writes '0' as the metadata assigned to every block.

In the present embodiment, similarly to the first and second embodiments, the processor 101, the memory 102, and the storage device 103 are provided, the memory 102 is connected to the processor 101, and the storage device 103 and the processor 101 are connected to each other by the IO bus 104, as described in FIG. 1A.

In the present embodiment, a data write operation for writing data into the storage device 103 and a subsequent data read operation for reading data from the storage device 103 will be described with reference to FIG. 10.

In FIG. 10, first, the processor 101 transmits a zero data Write command to the storage device 103 in Procedure 251. Next, the storage device 103 executes a zero data write process in accordance with the transmitted zero data Write command in Procedure 252. Subsequently, the storage device 103 transmits a zero data Write command completion response to the processor 101 in Procedure 253 similarly to Procedure 203 of FIG. 2 according to the second embodiment. Operations in subsequent Procedures 254 to 264 are the same as those in Procedures 204 to 214 of FIG. 2 except for differences described with reference to FIGS. 5 and 6.

Next, the operations performed by the storage device 103 according to the third embodiment will be described in more detail with reference to FIGS. 5 and 6.

Figure 5:
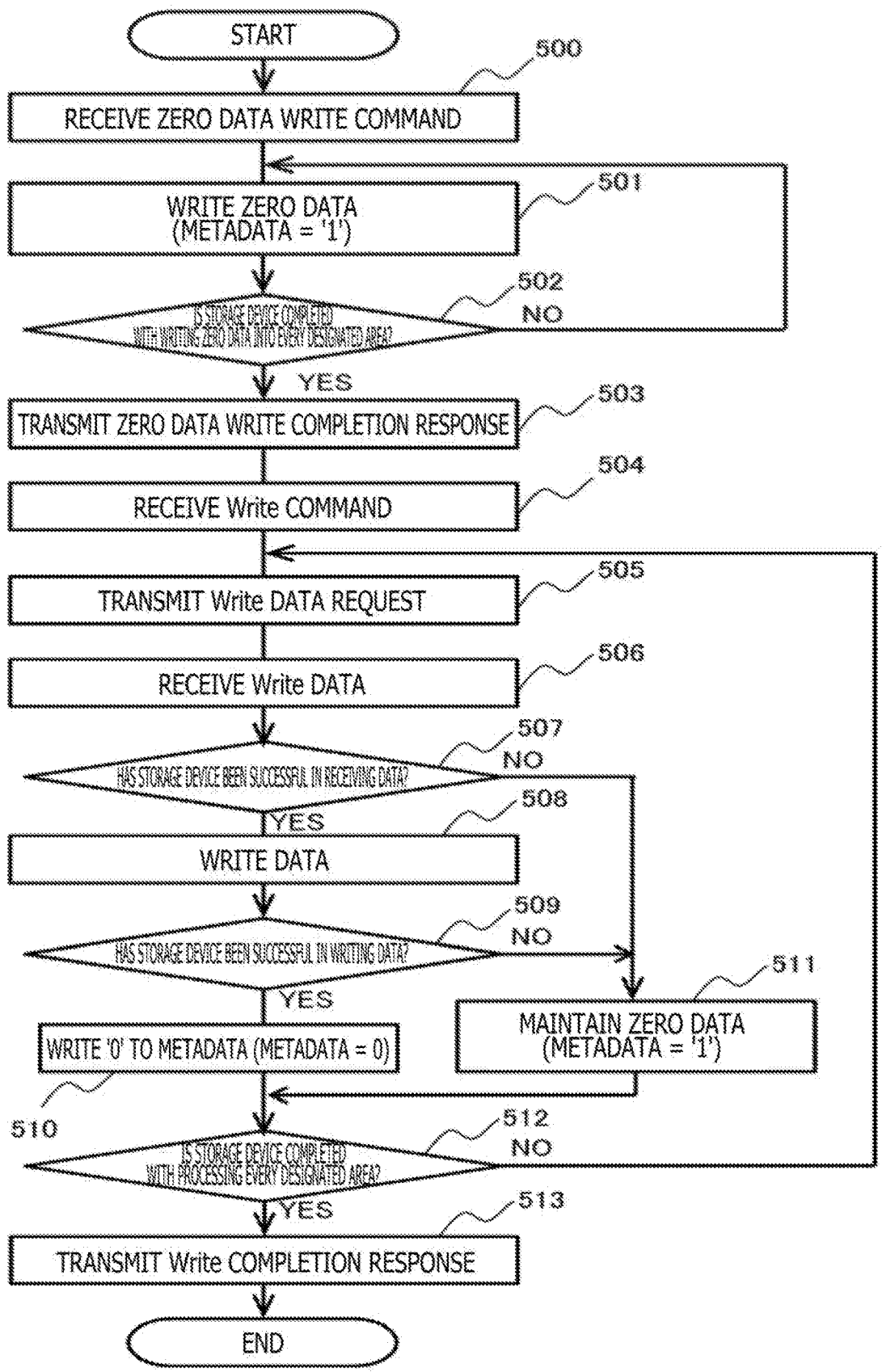
FIG. 5 is a flowchart depicting another example of the data write process by the control program over the storage device operating on the storage device according to the third and fourth embodiments of the present invention.

FIG. 5 is an example of a flowchart of operations when the storage device 103 receives the zero data Write command and the Write command in Procedures 251 to 259 of FIG. 10.

In FIG. 5, the storage device 103 receives the zero data Write command in Step 500. This corresponds to Procedure 251 of FIG. 10. The storage device 103 then goes to Step 501 to write the zero data into the internal memory media in accordance with the received zero data Write command. It is noted that, at that time, the storage device 103 writes '1' as the metadata. It is noted herein that, similarly to FIGS. 3 and 4 according to the second embodiment, when the storage device 103 is the semiconductor drive, the internal memory media is, for example, the flash memory incorporated into the semiconductor drive.

The storage device 103 then determines whether the storage device 103 completes writing the zero data into every designated area in Step 502. In a case in which a determination result of Step 502 is NO, the storage device 103 returns to Step 501 to execute writing the zero data until the storage device 103 completes writing the zero data into every designated area. Processes in Steps 501 and 502 correspond to Procedure 252 of FIG. 10.

In a case of determining in Step 502 that the storage device 103 completes a zero data write process on every designated area, the storage device 103 goes to Step 503 to transmit a zero data write completion response to the processor 101. This corresponds to Procedure 253 of FIG. 10.

In Step 504, the storage device 103 receives the Write command. This corresponds to Procedure 254 of FIG. 10. Next, in Step 505, the storage device 103 transmits the Write data request to the processor 101 in accordance with the received Write command. Subsequently, in Step 506, the storage device 103 receives the requested Write data. In Step 507, the storage device 103 determines whether the storage device 103 has been successful in receiving the Write data. In a case of having been successful in receiving the Write data as a result of determination, the storage device 103 writes the Write data into the internal memory media in Step 508.

In Step 509, the storage device 103 determines whether writing the Write data into the internal memory media is successful or not. In a case of determining that the writing the Write Data has been successful, the storage device 103 writes '0' as the metadata in Step 510.

In a case in which the storage device 103 has not been successful in receiving the Write data in Step 507 or in which the writing the Write data into the internal memory media is not successful in Step 509, the storage device 103 goes to Step 511 to maintain, as the data, the zero data with '1' written as the metadata.

In Step 512, the storage device 103 determines whether the storage device 103 completes processing every area designated by the received Write command. In a case in which the storage device 103 dose not complete processing, the storage device 103 returns to Step 505 to repeat subsequent processes.

In a case in which the storage device 103 completes processing, the storage device 103 goes to Step 513, transmits the Write completion response to the processor 101, and ends the processes.

Figure 6:
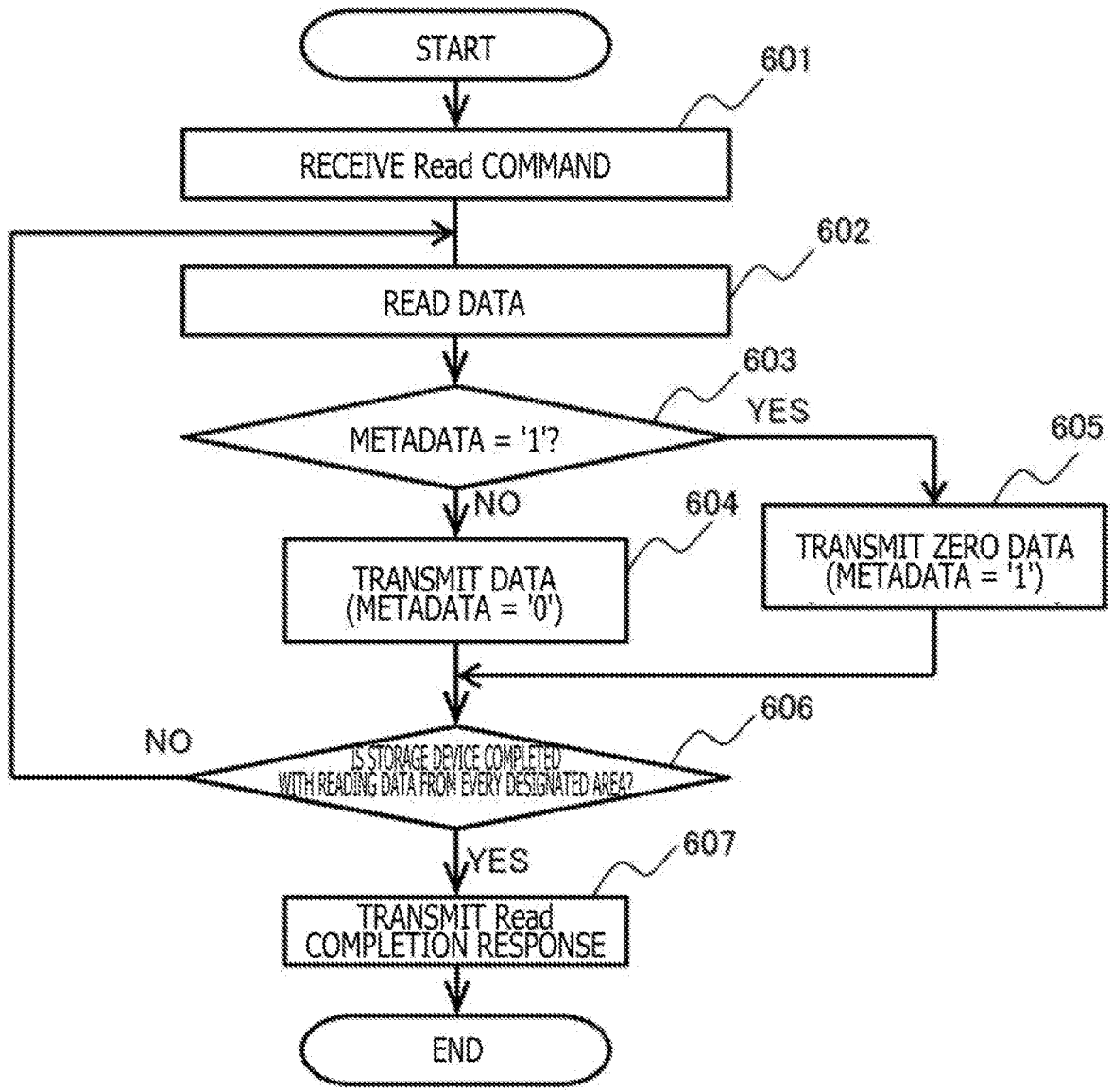
FIG. 6 is a flowchart depicting another example of the data read process by the control program over the storage device operating on the storage device according to the third embodiment of the present invention.

FIG. 6 is an example of a flowchart of operations when the storage device 103 receives the Read command in Procedures 260 to 264 of FIG. 10.

In FIG. 6, the storage device 103 receives the Read command in Step 601. The storage device 103 then goes to Step 602 to read the designated data from the internal memory media. It is noted herein that, similarly to FIG. 5, when the storage device 103 is the semiconductor drive, the internal memory media is, for example, the flash memory incorporated into the semiconductor drive.

The storage device 103 then determines whether the metadata assigned to the data read from the internal memory media is '1' in Step 603. In a case in which the metadata is not '1' as a result of determination, the storage device 103 determines that the data has been successfully written, and transmits the data to the processor 101 in Step 604. At this time, even in a case in which the metadata that is not '1', the storage device 103 transmits the data with the metadata assigned to the data.

In a case of determining in Step 603 that the metadata assigned to the data read from the internal memory media is '1', the storage device 103 determines that the data has not been successfully written, and goes to Step 605 to transmit the zero data to which the metadata of the value '1' is assigned to the processor 101.

In any of the cases of Steps 604 and 605, the storage device 103 then goes to Step 606 to determine whether the storage device 103 completes reading data from every area designated by the Read command. In a case in which there remains a designated area from which the storage device 103 does not complete reading data as a result of determination, the storage device 103 returns to Step 602 to repeat subsequent processes.

In a case in which the storage device 103 completes reading data from every designated area as a result of the determination in Step 606, the storage device 103 transmits the Read completion response to the processor 101 in Step 607 and ends the processes.

Figure 7:
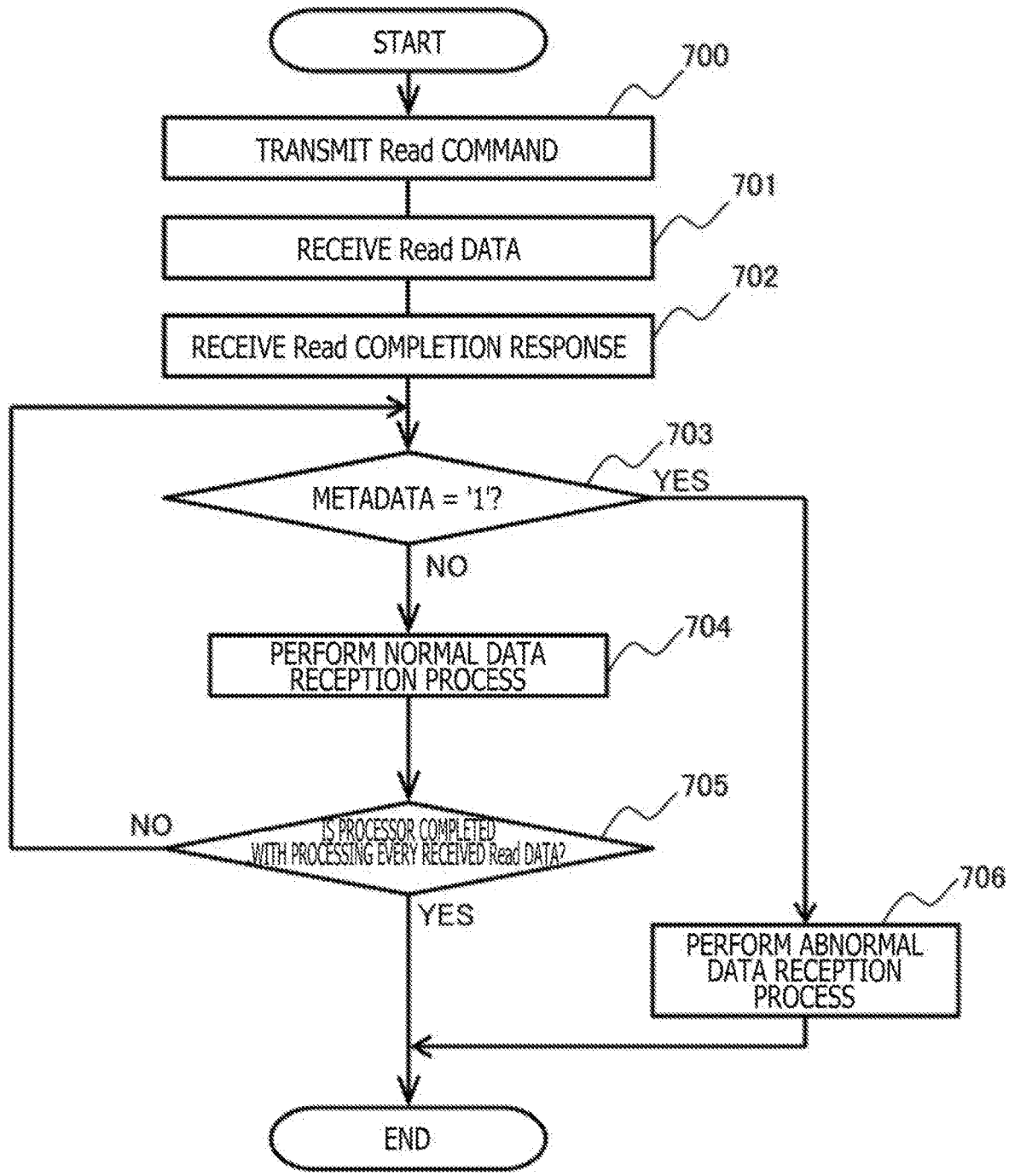
FIG. 7 is a flowchart depicting an example of a data read process by a control program operating on a processor according to the third embodiment of the present invention.

FIG. 7 is an example of a flowchart of processes by the processor 101 when the processor 101 transmits the Read command to the storage device 103 and reads data from the storage device 103.

In FIG. 7, the processor 101 transmits the Read command in Step 700. In Step 701, the processor 101 then receives the Read data. The processor 101 stores the receive data together with the metadata in the memory 102. Next, in Step 702, the processor 101 receives the Read completion response.

Subsequently, in Step 703, the processor 101 examines the metadata about the data stored in the memory 102 in sequence to determine whether the metadata is '1'. In a case of determining that the metadata is not '1', the processor 101 determines to have received the correct data, and goes to Step 704 to perform a process at the time of receiving the correct data.

Next, in Step 705, the processor 101 determines whether the processor 101 completes processing every received Read data. In a case in which the processor 101 does not complete processing every received Read data, the processor 101 returns to Step 703 to repeat the processes.

Furthermore, in a case of determining that the metadata is '1', the processor 101 goes to Step 706 to perform a process at the time of receiving uncorrectable data.

Through executing the processes described above, the data with the metadata '1' is read to the processor 101 at the time of reading the data from the storage device 103 in the case in which the storage device 103 has not been successful in writing the data; thus, it is possible to detect that the storage device 103 has not been successful in writing the data. Furthermore, using not the data invalidating command but the zero data Write command with '1' written as the metadata makes it possible to obtain the advantages described above.

It is noted that the zero data Write command is an example of a command to write the data in the predetermined pattern and the metadata. In a case in which a command to write data in a pattern other than the zero data can be used, such the command may be used. Furthermore, in a case in which it is possible to identify that the data written by the command is not written by the normal Write command, that is, the data is invalid data, from the pattern of the data, the processor 101 may determine whether the processor 101 has received the normal data on the basis of the pattern of the received Read data without depending on the metadata in Step 703. In this case, the storage device 103 does not need to assign the metadata to the zero data in response to the zero data Write command in Step 501, and does not need to transmit the metadata in Steps 604 and 605.

Fourth Embodiment

A fourth embodiment of the present invention will next be described with reference to FIGS. 1A, 5, 6, 9, 10, and 11. Since sections in the fourth embodiment are the same as those denoted by the same reference codes in the first to third embodiments described in FIGS. 1A and 1B to 10, and the like except for differences described below, description of the sections will be omitted.

In the fourth embodiment of the present invention, similarly to the third embodiment, the data to which the metadata is assigned is stored in the storage device 103 as described in FIG. 9B or 9C, as opposed to data in block units described in FIG. 9A.

Furthermore, in the fourth embodiment, similarly to the third embodiment, the zero data Write command is used as an alternative to the data invalidating command to be sent to the storage device 103. Similarly to the third embodiment, FIG. 9D describes the example of the zero data Write command. Furthermore, in the present embodiment, similarly to the third embodiment, the storage device 103 writes the zero data as the data and writes '1' as the metadata assigned to data in every block by the zero data Write command. On the other hand, in a case of writing data by the normal Write command, the storage device 103 writes '0' as the metadata.

It is assumed in the present embodiment, similarly to the first to third embodiments, that the processor 101, the memory 102, and the storage device 103 are provided, the memory 102 is connected to the processor 101, and the storage device 103 and the processor 101 are connected to each other by the IO bus 104, as described in FIG. 1A.

An example of a data write operation for writing data into the storage device 103 and a subsequent data read operation for reading data from the storage device 103 is the same as that described in FIG. 10 according to the third embodiment. Description is also the same as that given with reference to FIG. 10 according to the third embodiment.

Figure 11:
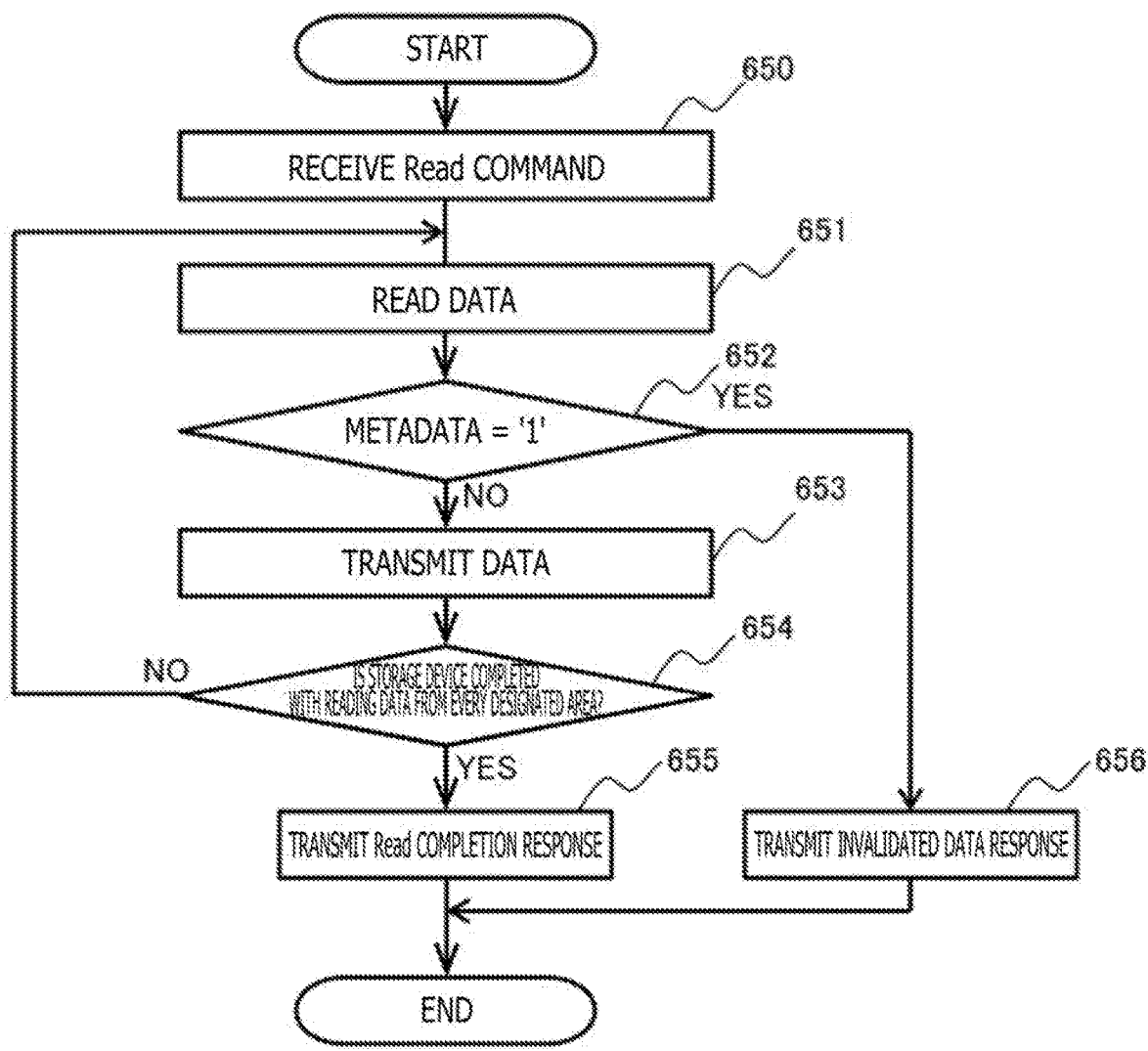
FIG. 11 is a flowchart depicting yet another example of the data read process by the control program over the storage device operating on the storage device according to the fourth embodiment of the present invention.

In the present embodiment, FIG. 11 is used as an alternative to FIG. 6 as an example of a flowchart of operations when the storage device 103 receives the Read command in Procedures 260 to 264 of FIG. 10.

In FIG. 11, the storage device 103 receives the Read command in Step 650. The storage device 103 then goes to Step 651 to read the designated data from the internal memory media. It is noted herein that, similarly to FIG. 5, when the storage device 103 is the semiconductor drive, the internal memory media is, for example, the flash memory incorporated into the semiconductor drive.

The storage device 103 then determines whether the metadata assigned to the data read from the internal memory media is '1' in Step 652. In a case in which the metadata is not '1' as a result of determination, the storage device 103 determines the data has been successfully written, and transmits the data to the processor 101 in Step 653. In Step 653, the storage device 103 either may assign the metadata to the data and transmit the metadata-assigned data to the processor 101 or may transmit the data from which the metadata is removed. It is assumed that an arrangement is made between the processor 101 and the storage device 103 in advance as to what type of data is to be transmitted.

The storage device 103 then goes to Step 654 to determine whether the storage device 103 completes reading data from every area designated by the Read command. In a case in which there remains a designated area from which the storage device 103 does not complete reading data as a result of determination, the storage device 103 returns to Step 651 to repeat subsequent processes.

In a case in which the storage device 103 completes reading data from every designated area as a result of the determination in Step 654, the storage device 103 transmits the Read completion response to the processor 101 in Step 655 and ends the processes.

In a case of determining in Step 652 that the metadata about the data read from the internal memory media is '1', the storage device 103 determines the data has not been successfully written, goes to Step 656 to transmit the invalidated data response to the processor 101, and ends the processes.

Through executing the processes described above, the invalidated data response is transmitted to the processor 101 at the time of reading the data from the storage device 103 in a case in which the storage device 103 has not been successful in writing the data; thus, it is possible to detect that the storage device 103 has failed in writing the data.

Furthermore, in a case in which the data has not been normally written, the storage device 103 transmits the invalidated data response to the processor 101; thus, it is possible to determine that the data has not been successfully written on the basis of whether the response from the storage device 103 is the normal Read completion response or the invalidated data response without causing the processor 101 to determine whether the metadata is '1'. This can reduce the processes by the processor 101 with respect to the determination.

It is noted that a command to write data in a pattern other than the zero data may be used as an alternative to the zero data Write command in the fourth embodiment similarly to the third embodiment. Furthermore, in a case in which it is possible to identify whether the data written by the command is invalid from the pattern of the data, the storage device 103 may determine that the data has been normally written on the basis of the pattern of the Read data without depending on the metadata in Step 652.

The present invention is not limited to the embodiments described above and encompasses various modifications. For example, the above embodiments have been described in detail for helping better understanding of the present invention. The present invention is not always limited to the embodiments having all the described configurations. Furthermore, the configuration of a certain embodiment can be partially replaced by the configuration of the other embodiment or the configuration of the other embodiment can be added to the configuration of the certain embodiment. Moreover, for a part of the configuration of each embodiment, additions, omissions, and substitutions of the other configurations can be made.

Furthermore, configurations, functions, processing sections, processing means, and the like described above may be realized by hardware by, for example, designing a part or all thereof with integrated circuits. Moreover, the configurations, functions, and the like described above may be realized by software by causing a processor to interpret and execute programs that realize the respective functions. Information about the programs, tables, files, and the like for realizing the functions may be stored in a recording device such as a non-volatile memory, a hard disc drive, or a solid state drive (SSD), or in a computing machine-readable non-transitory storage medium such as an integrated circuit (IC) card, an secure digital (SD) card, or a digital versatile disc (DVD).

Furthermore, control lines or information lines considered to be necessary for the description are illustrated and all the control lines or the information lines are not always illustrated in terms of a product. It may be considered that almost all the configurations are actually and mutually connected.

What is claimed is:

1. An information processing system to determine whether data has been correctly written into a storage device, wherein the information processing system operates at a low overhead and comprises:
   a processor;
   a memory connected to the processor; and
   a storage device connected to the processor, wherein
   the processor transmits, to the storage device, a command to invalidate data in a data area in the storage device into which data is to be written and which is designated by a write command, before transmitting the write command to the storage device,
   the storage device invalidates the data in the data area into which data is to be written designated by the command to invalidate the data in the data area into which data is to be written by assigning a mark in the data area into which data is to be written indicating that a read error is transmitted to the processor in a case of receiving a read command from the processor to read data from a data area into which data is to be written, and transmitting information indicating that the data is invalidated to the processor, wherein the command to invalidate the data does not itself need data and is not assigned to a memory address,
   the processor transmits, to the storage device, the write command to write the data into the data area in the storage device into which data is to be written, and the storage device
- writes the data into the data area into which data is to be written designated by the write command,
- validates the written data in a case in which the storage device has been successful in writing all the data into the data area into which data is to be written,
- deletes the mark in the data area into which data is to be written, wherein the data area into which data is to be written contains the data which has been validated by the processor,
- transmits the read error to the processor in a case in which the mark is assigned to at least part of the data area from which data is to be read in response to the read command, and
- maintains the data invalidated in the data area into which data is to be written in a case in which the storage device has failed in writing the data into the at least part of the data area into which data is to be written.

2. The information processing system according to claim 1, wherein
- the command to invalidate the data in the data area into which data is to be written is a command involving writing data of a predetermined pattern into the data area into which data is to be written,
- the storage device writes the data of the predetermined pattern into the data area into which data is to be written, and
- in a case of reading the data of the predetermined pattern by a read command, the storage device transmits the read data of the predetermined pattern to the processor.

3. The information processing system according to claim 2, wherein the storage device
- further writes additional data indicating that the data in the data area into which data is to be written is invalid in a case of receiving the command that is to invalidate the data in the data area into which data is to be written and that involves writing the data of the predetermined pattern into the data area into which data is to be written,
- updates the additional data corresponding to a data area into which the data has been successfully written in response to the write command, to additional data indicating that the data in the data area is valid, and
- transmits, to the processor, data read from a data area from which data is to be read in response to the read command, and the additional data corresponding to the data area from which data is to be read in response to the read command.

4. The information processing system according to claim 2, wherein
the storage device
- further writes additional data indicating that the data in the data area into which data is to be written is invalid in a case of receiving the command that is to invalidate the data in the data area into which data is to be written and that involves writing the data of the predetermined pattern into the data area into which data is to be written,
- updates the additional data corresponding to a data area into which the data has been successfully written in response to the write command, to additional data indicating that the data in the data area is valid, and
- transmits, to the processor, information indicating that the data is invalidated in a case in which the additional data corresponding to a data area from which data is to be read in response to the read command indicates that the data in the data area from which data is to be read in response to the read command is invalid.

5. The information processing system according to claim 1, wherein
- upon reception of the write command, the storage device transmits, to the processor, a data request to acquire data to be written in response to the write command,
- the processor reads the data from the memory and transmits the data to the storage device in accordance with the data request, and
- the storage device writes the data received from the processor into the data area into which data is to be written.

6. A method of controlling a storage device in an information processing system to determine whether data has been correctly written into a storage device, wherein the information processing system operates at a low overhead and includes: a processor;
a memory connected to the processor; and a storage device connected to the processor, the method comprising:
- by the processor, a first procedure of transmitting, to the storage device, a command to invalidate data in a data area in the storage device into which data is to be written and which is designated by a write command, before transmitting the write command to the storage device;
- by the storage device, a second procedure of invalidating the data in the data area into which data is to be written in accordance with the command to invalidate the data in the data area into which data is to be written by assigning a mark in the data area into which data is to be written indicating that a read error is transmitted to the processor in a case of receiving a read command to read data from a data area into which data is to be written, and transmitting information indicating that the data is invalidated to the processor, wherein the command to invalidate the data does not itself need data and is not assigned to a memory address;
- by the processor, a third procedure of transmitting, to the storage device, the write command to write the data into the data area into which data is to be written; and
- by the storage device, a fourth procedure of writing the data into the data area into which data is to be written in accordance with the write command, wherein
in the fourth procedure, the storage device:
- validates the written data in a case in which the storage device has been successful in writing the data into the data area into which data is to be written,
- deletes the mark in the data area into which data is to be written, wherein the data area into which data is to be written contains the data which has been validated by the processor,
- transmits the read error to the processor in a case in which the mark is assigned to at least part of the data area from which data is to be read in response to the read command,
- and maintains the data invalidated in the data area into which data is to be written in a case in which the storage device has failed in writing the data into the at least part of the data area into which data is to be written.

7. The method of controlling the storage device according to claim 6, wherein
- the command to invalidate the data in the data area into which data is to be written is a command involving writing data of a predetermined pattern into the data area into which data is to be written,
- in the second procedure, the storage device writes the data of the predetermined pattern into the data area into which data is to be written, and
- the method of controlling the storage device further comprises, by the storage device, in a case of reading the data of the predetermined pattern in accordance with a read command, a sixth procedure of transmitting the read data of the predetermined pattern to the processor.

8. The method of controlling the storage device according to claim 7, wherein
- in the second procedure, the storage device further writes additional data indicating that the data in the data area into which data is to be written is invalid in a case of receiving the command that is to invalidate the data in the data area into which data is to be written and that involves writing the data of the predetermined pattern into the data area into which data is to be written,
- in the fourth procedure, the storage device updates the additional data corresponding to a data area where the data has been successfully written in response to the write command, to additional data indicating that the data in the data area is valid, and
- in the sixth procedure, the storage device transmits, to the processor, data read from a data area from which data is to be read in response to the read command, and the additional data corresponding to the data area from which data is to be read in response to the read command.

9. The method of controlling the storage device according to claim 7, wherein
- in the second procedure, the storage device further writes additional data indicating that the data in the data area into which data is to be written is invalid in a case of receiving the command that is to invalidate the data in the data area into which data is to be written and that involves writing the data of the predetermined pattern into the data area into which data is to be written,
- in the fourth procedure, the storage device updates the additional data corresponding to a data area where the data has been successfully written in response to the write command, to additional data indicating that the data in the data area is valid, and
- in the sixth procedure, the storage device transmits, to the processor, information indicating that the data is invalidated in a case in which the additional data corresponding to a data area from which data is to be read in response to the read command is additional data indicating that the data is invalid.

10. The method of controlling the storage device according to claim 6, further comprising:
- by the storage device, upon reception of the write command, transmitting, to the processor, a data request to acquire data to be written in response to the write command; and
- by the processor, reading the data from the memory and transmitting the data to the storage device in accordance with the data request, wherein
- in the fourth procedure, the storage device writes the data received from the processor into the data area into which data is to be written.

* * * * *